United States Patent Office 2,927,901
Patented Mar. 8, 1960

2,927,901

MATERIALS FOR CLEANSING THE HAIR

Edouard J.-F. Charret, Caluire, France

No Drawing. Application September 23, 1957
Serial No. 685,396

Claims priority, application France September 26, 1956

8 Claims. (Cl. 252—153)

This invention relates to materials for cleansing the hair and particularly to compositions containing diamines and their uses.

It is a primary object of this invention to provide compositions for cleansing the hair possessing all those properties which are desired of a good shampoo, i.e., the formation of an abundant and consistent lather, excellent detergent power, a power of inhibiting re-deposition of dirt, insensitivity to hard water, non-toxicity to the epidermis, and innocuity to the mucous membranes of the eye; a further object is to provide compositions as aforesaid, which impart to the hair special properties which are of great interest, namely gloss, combing facility, an improvement in the facility with which dyes may be developed thereon, and anti-static properties.

According to the present invention there are provided compositions in the form of homogeneous, aqueous solutions for cleansing human hair which comprise acid aqueous solutions of pH 3 to 7 of acid-soluble diamines of the general formula

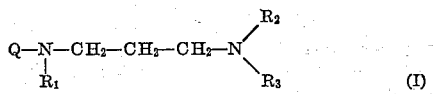

(I)

where Q represents a hydrophobic radical responsible for the formation of surface-active derivatives and containing 12 to 22 carbon atoms and the R substituents are selected from the class consisting of (a) Groups of the formula $-(CH_2)_m-COOH$
(b) Groups of the formula $-(C_nH_{2n}O)_p-H$
(c) Hydrogen atoms where $m$ is an integer from 1 to 3, $n$ is an integer from 2 to 3 and $p$ is an integer from 1 to 8, the total number of groups (a) being comprised in the range 1 to 2 and at least one group (b) being present in the molecule.

The lower carboxy-alkyl group is preferably a carboxymethyl, β-carboxyethyl or β-carboxypropyl group. Preferably those compounds are employed in which the radicals Q of the individual constituents corespond to those of the constituents of industrial mixtures of fatty amines of natural or synthetic origin.

The bitertiary and secondary-tertiary diamines are ampholytic compounds containing two amino groups which can be converted by acids into salt groups, an acid group and from 2 to 8 oxyalkyl groups. These compounds, depending upon their method of preparation, may conform to the isomeric formulae $$Q-N-CH_2-CH_2-CH_2-NH-(CH_2)_m-COOH \quad (II)$$
$$\phantom{Q-N-}|$$
$$\phantom{Q-N-}(C_nH_{2n}O)_pH$$

and

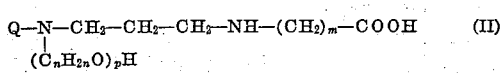

(III)

and

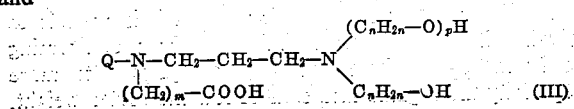

(IV)

wherein $m$ is an integer from 1 to 3, $n$ is an integer from 2 to 3 and $p$, or the total of $p$ and $p_1$ is 1 to 8.

Various processes may be employed for the preparation of the aforesaid compounds.

In one of these processes, acrylonitrile and an amine Q—NH₂ (or a mixture of such amines) are condensed in equimolecular proportions, whereafter 4 to 6 molecules of ethylene oxide are attached to the condensation product obtained, the oxyethylenated product is subjected to catalytic hydrogenation in order to convert it into a primary-tertiary diamine (or into a mixture of such diamines), and this diamine or the mixture is then reacted with the appropriate lower monohalogeno-alkanoic acid in the presence of a halohydric acid binding agent.

In accordance with a first variant, a diamine or a mixture of diamines conforming to formula $$Q-NH-CH_2-CH_2-CH_2-NH_2 \quad (V)$$

is employed as the initial substance, which is condensed with an appropriate polyglycol monohalohydrin, or its mixture with a glycolmonohalohydrin, and the oxyethylenated product thus formed is reacted with an alkali salt of the appropriate monohalogeno-alkanoic acid.

In accordance with a second variant, a diamine or a mixture of diamines conforming to Formula V is first condensed with an acrylic or methacrylic ester, in equimolecular proportions, whereafter the desired number of molecules of ethylene oxide is attached to the molecule of the diamine containing an esterified β-carboxyethyl or β-carboxypropyl group (or the mixture of such diamines), and the product obtained is saponified.

Generally speaking, in the products prepared as hereinbefore described, the carboxyl group is present as a sodium salt (for example by reason of the use of halogenoalkanoic acid in the form of a sodium salt or by reason of the use of a caustic alkali solution for the saponification). Therefore, the sodium salt is present in the crude product at the end of the reaction, generally suspended in the resulting reaction mixture, which may or may not contain sodium chloride in solution, depending upon the method of preparation.

Such a crude product of reaction may be directly employed for the preparation of a shampoo in solution by adding thereto an acid in such quantity that the product is entirely solubilised and brought to a pH between 3 and 7. For this purpose, use may be made of an inorganic acid, such as hydrochloric acid or phosphoric acid, or an organic acid. Preference is given to organic acids of low molecular weight, such as formic, acetic or propionic acid, hydroxyacids of low molecular weight, such as glycolic, lactic or glyceric acid, diacids of low molecular weight such as malonic and succinic acid, or hydroxy polyacids of low molecular weight such as malic, tartaric or citric acid.

The aforesaid acids are mentioned only as examples. Any acid giving water-soluble salts with the diamines in question may be used. Nevertheless, it is advantageous to choose the acids most compatible with the skin, notably hydroxy acids such as lactic acid, which, in addition, adds to the unctuosity of the lather.

If it is desired to avoid the presence of sodium salts in the shampoo, the crude product of reaction may be neutralized by means of a sufficient quantity of acid to bring the pH to 7 and the amino acid may then be extracted by means of an appropriate solvent, such as amyl alcohol or methyl isobutyl ketone. The product free from inorganic acid salts is then isolated by evaporation of the solvent and redissolved in an appropriate acid aqueous medium, at the desired concentration and pH.

The following examples illustrate the invention but are not to be regarded as limiting it in any way:

EXAMPLE I

*Preparation of a shampoo from a compound conforming to Formula II*

One mol. (280 g.) of a primary aliphatic amino compound of formula R—NH$_2$, in which R broadly represents a composite aliphatic chain derived from a crude fatty acid material and containing from 14 to 18 carbon atoms as an average, is condensed, by heating at 70° C. for one hour, with one mol. (53 g.) of acrylonitrile, in accordance with the reaction:

R—NH$_2$+CH$_2$=CH—CN→R—NH—CH$_2$—CH$_2$—CN

In the presence of 0.2% of caustic soda as a catalyst, ethylene oxide is then bubbled into the crude product until five moles of ethylene oxide per mole of said product are fixed, i.e. until a weight increase of 220 g. is obtained, in accordance with the reaction:

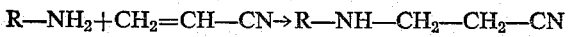

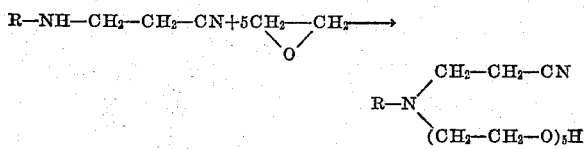

The oxyethylenated aminonitrile thus obtained is then subjected to hydrogenation at 100–110° C. under a pressure of 10 kg. of hydrogen in the presence of about 2% of Raney nickel, thus:

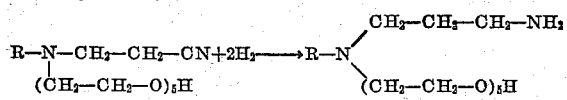

553 g. of the oxyethylenated diamine obtained are mixed with 1500 cc. of water containing 45 g. of sodium hydroxide. A solution of sodium monochloracetate is also prepared by dissolving 144 g. of this salt in 500 cc. of water.

The two solutions are mixed and maintained at 40–50° C. under stirring for three hours. The mixture is then brought to 90° C. and maintained at said temperature for one hour.

The mass is treated with lactic acid until a pH value of 4 is reached.

The solution obtained is then ready for use.

EXAMPLE II

*Preparation of a shampoo from a compound conforming to Formula III*

50 g. of base conforming to Formula V, in which R represents an unsaturated chain of 18 carbon atoms (oleyl), are dissolved in a mixture of 26 g. of monochlorhydron of "polyglycol 212" and 12 g. of glycol monochlorhydrin, that is to say, respectively:

Cl—(CH$_2$—CH$_2$—O)$_4$H and Cl—CH$_2$—CH$_2$OH

The substances are well mixed and the mixture is heated under stirring to 130° C., at which temperature the reaction starts.

After one hour's reaction, the product is heated for a further twenty minutes at 140° C. and allowed to cool. A 30% caustic soda solution is added to neutralise the hydrochloric acid formed in the course of the reaction.

The reaction product separates into two layers. After a while, the lower aqueous layer is run off.

To the upper layer is added a sodium monochloracetate solution obtained by dissolving 16 g. of monochloracetic acid in 100 cc. of water and neutralizing the mixture with caustic soda below 20° C. The mixture is heated on the water bath at 80° C. for 2 hours. The pH is brought to 12 by adding caustic soda and the product is boiled for 1 hour to hydrolyze the excess of monochloracetic acid.

The product obtained is neutralized to a pH of 7 by means of hydrochloric acid and acetic acid is added until a pH value of 4 is reached.

A shampoo ready for use is thus obtained.

EXAMPLE III

*Preparation of a shampoo from a compound conforming to Formula IV*

In a closed vessel, there is maintained at 90–100° C. for 1 hour, under constant stirring a mixture consisting of:

400 g. of technical 1-(N-dehydro-abietyl)-1,3-propane-diamine of the formula

R—NH—CH$_2$—CH$_2$—CH$_2$—NH$_2$ in which R represents the dehydro-abietyl radical, and 100 g. of methyl methacrylate.

The condensation takes place in accordance with the reaction:

R—NH—CH$_2$—CH$_2$—CH$_2$—NH$_2$+CH$_2$
=C(CH$_3$)—COOCH$_3$→R—NH—CH$_2$—CH$_2$
—CH$_2$—NH—CH$_2$—CH(CH$_3$)—COOCH$_3$

Six moles of ethylene oxide are bubbled into 500 g. of the resulting compound in the presence of 0.2% of NaOH as catalyst until a weight increase of 264 g. is obtained. The condensation takes place in accordance with the reaction:

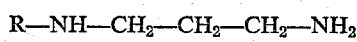

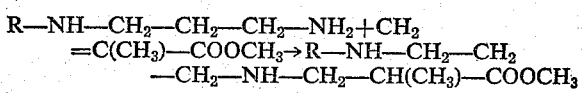

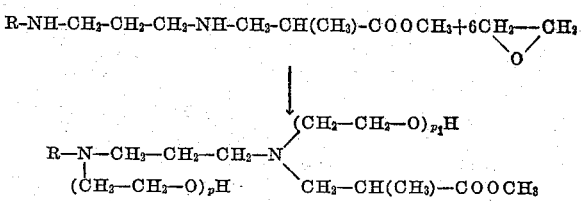

where $p+p_1=6$.

764 g. of the compound thus formed are mixed under stirring with 1500 cc. of water containing 45 g. of caustic soda, and the mixture is stirred for one hour at 90° C. in order to saponify the ester and eliminate the methyl group.

The product obtained is adjusted by means of hydrochloric acid to a pH of 7, and the pH is then brought to 4.3 by the addition of acetic acid.

The resulting solution can be used as such for shampooing the hair.

Other surface-active products may be added to the aqueous solution of the oxyethylenated amino acid, converted to a salt in aqueous solution, provided that these surface-active products are non-ionic products such as those obtained by condensation of ethylene oxide with alkyl phenols, fatty alcohols, fatty acids or fatty amides.

An example of such a composite mixture is the following:

EXAMPLE IV

There are intimately mixed:

| | G. |
|---|---|
| Oxyethylenated amino acid (counted as pure) prepared in accordance with the foregoing Example II | 20 |
| Oxyethylenated alkyl phenol | 12 |
| Lactic acid, q.s. for a pH of 3.8. | |
| Water up to 100 g. | |

The oxyethylenated alkyl phenol employed is obtained by cendensation of 10–11 moles of ethylene oxide with one mole if diisobutyl phenol.

Applicant has furthermore found that it is possible to obtain ditertiary diamines similar to those conforming to Formula III, whose inorganic or organic salts, more especially the organic acid salts of low molecular weight, notably the lactates, are particularly suitable for the treatment of the hair, when the proportions of the reactants (in the process hereinbefore described as the first variant) are so chosen as to have a number of lower carboxyalkyl groups attached to the molecules of the initial diamine or diamines higher than 1, while not exceeding 2. A further advantage has been found in grafting the more so —CH₂—CH₂—O— units to the original diamine or diamines of Formula V as there are more lower carboxyalkyl groups, whereas the number of —CH₂—CH₂—O— units should not exceed 8.

Even if a single diamine of Formula V is used, the finished product is, in fact, a mixture of ditertiary diamines of Formula III in which the mean number of carboxyalkyl groups is higher than 1 and at most equal to 2, that is to say, may have values such as 1.2 or 1.5 for example, and the mean number of —($C_nH_{2n}O$)$_p$—H groups, $p$ having a value from 2 to 8, is the balance to 3.

The aforesaid salts of the new ditertiary diamines thus prepared comprise on an average, on the nitrogen atoms taken as a whole, more than 1 and at most 2 lower carboxyalkyl groups and from 2 to 8 —$C_nH_{2n}O$— units. They offer the advantage of leading to hair-washing products which are subsequently much more readily removed by rinsing, and which are even less harmful to the mucous membranes.

Although the lactates are particularly effective, other organic and inorganic acid salts may also advantageously be used for the preparation of hair-washing products, as described above.

EXAMPLE V

Into a round-bottomed flask equipped with a mechanical stirrer, a reflux condenser and a dropping funnel there are introduced: 365 g. of 1-(N-alkyl)-1,3-propanediamine

wherein the letter R broadly represents the composite chain corresponding to the fatty acids of tallow.

The mixture is heated at 110–115° C. and there are progressively added 130 g. of ethylene glycol monochlorhydrin so that the temperature rises to a level of 140–150° C.

The mixture is maintained at 140–150° C. for one hour. A determination of the acid number of the mixture, effected after one hour, should give values between 173 and 179 (mg. of KOH per gramme of the product), failing which the heating is continued until this acid number is reached. There is finally obtained a pasty mass.

The product obtained is cooled to 100° C. and diluted with an equal volume of hot water. An aqueous caustic soda solution obtained by dissolving 65 g. of NaOH in 130 cc. of water is added. The mixture is stirred until the lumps disappear and is allowed to settle. The lower aqueous layer is then run off.

A solution of sodium monochloracetate is prepared by adding to a solution of 165 g. of monochloracetic acid in 130 g. of water a solution of 70 g. of caustic soda in 140 g. of water, the addition being effected in such manner that the temperature does not exceed 30–40° C.

This solution is then stirred into the condensation product and the whole is heated at 80° C. A solution of 40 g. of caustic soda in 60 cc. of water is then slowly added and the mixture is brought to 100° C. The mass is maintained at this temperature for one hour, under constant stirring.

The product obtained must be completely soluble in water, failing which the heating is continued until this solubility is attained.

Finally, the product is neutralized by adding 100 g. of concentrated hydrochloric acid in such manner that a temperature of 60° C. is not exceeded. A paste is obtained which contains about 45% of active product corresponding to a mixture of ditertiary diamines, corresponding to the formula:

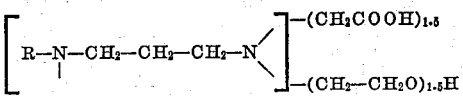

This pulp is diluted with twice its volume of water and lactic acid is added thereto under stirring until a pH value of 5 is reached. A shampoo ready for use is thus obtained.

EXAMPLE VI

Into a round-bottomed flask similar to that employed in Example V there are introduced: 380 g. of 1-(N-dehydroabietyl)-1,3-propanediamine.

By proceeding as in Example V, there are added: 330 g. of "polyglycol 220" monochlorhydrin corresponding to the formula:

The condensation reaction is carried out as described in Example V.

There is also prepared a sodium monochloracetate solution by adding to a solution of 185 g. of monochloracetic acid in 150 g. of water a solution of 78 g. of caustic soda in 160 g. of water, care being taken that the temperature does not exceed 30–40° C.

This solution is then stirred into the condensation product and the mass is heated to 80° C. A solution of 45 g. of NaOH in 70 cc. of water is then slowly added and the mixture is heated at 100° C. for one hour.

Whatever the proportions, the product obtained must be completely soluble in water.

The product is neutralized by the addition of 115 g. of concentrated hydrochloric acid under constant stirring and without exceeding 60° C. A paste is obtained which contains about 52% of active product corresponding to a mixture of ditertiary diamines conforming to the average formula:

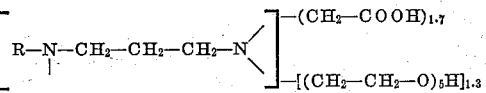

R=dehydroabietyl radical.

This paste diluted with three times its volume of water and adjusted to a pH value of 4 by means of acetic acid gives a shampoo ready for use.

There may be added to the shampoos obtained adjuvants such as thickeners of the conventional type, provided that they are compatible with the cationic medium, lather-sustaining agents such as alkanolamides, oxyethylenated or not, dyes and perfumes.

It will be noted that while the invention has been described more particularly in relation to oxyethyl compounds ($n=2$) it may also be employed with the corresponding oxypropyl compounds ($n=3$). The following is an example:

EXAMPLE VII 35 g. of methyl methacrylate are added to 100 g. of technical grade 1-(N-dodecyl)-1,3-propanediamine dissolved in a mixture of 40 g. methanol and 20 g. water. The solution obtained is kept at 40–45° C. for 50 hours. There is then added 37 g. of propylene oxide and the solution is kept at 40–45° C. for 40 hours under constant stirring. The methanol is then distilled away under reduced pressure, the temperature not exceeding 40° C.

The resulting product is dissolved under stirring in a mixture of 580 g. water and 75 g. lactic acid, producing a shampoo ready for use.

By the term "isomeric formula" as given above for the Formulae II, III and IV, I mean a formula wherein the carboxyalkyl and oxyalkyl groups are represented by way of illustration only, it being understood that either of said groups can be bound to either of the nitrogen atoms present in the molecule.

By the term "a hydrophobic radical responsible for the formation of surface-active derivatives and containing 12 to 22 carbon atoms" as used in the specification and by the term "a hydrophobic radical selected from the class consisting of straight aliphatic hydrocarbon residues of fatty acids containing 12 to 22 carbon atoms and dehydroabietyl radical" as used in the appended claims, I mean a higher hydrophobic hydrocarbon radical of one of the types, present in the molecule of most surface-active agents, for instance in the well-known alkaline soaps of fatty acids, the hydrophobic chain of which is either saturated (as in stearyl) or unsaturated (as in oleyl), and in the alkaline soaps of rosin acids and rosin acid derivatives (as in dehydroabietyl).

What I claim is:

1. A composition for cleansing live human hair, which is a homogeneous aqueous solution having a pH value of the range 3–7, of a diamine of the general formula

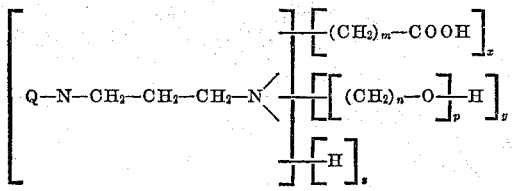

where Q represents a hydrophobic radical selected from the class consisting of straight aliphatic hydrocarbon residues of fatty acids containing 12 to 22 carbon atoms and the dehydroabietyl radical, $m$ represents an integer from 1 to 3, $n$ represents an integer from 2 to 3, $p$ represents a number from 1 to 8, $x$ and $y$ each represent a number from 1 to 2, the sum $x+y$ being at most equal to 3, and $z$ represents $3-(x+y)$.

2. A composition for cleansing live human hair, which is a homogeneous aqueous solution of a diamine of the general formula

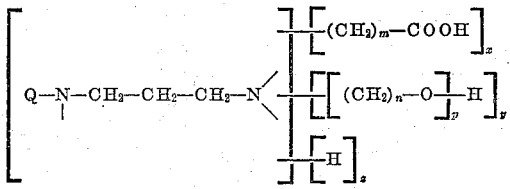

where Q represents a hydrophobic radical selected from the class consisting of straight aliphatic residues of fatty acids containing 12 to 22 carbon atoms and the dehydroabietyl radical, $m$ represents an integer from 1 to 3, $n$ represents an integer from 2 to 3, $p$ represents a number from 1 to 8, $x$ and $y$ each represent a number from 1 to 2, the sum $x+y$ being at most equal to 3, and $z$ represents $3-(x+y)$; and a lower aliphatic carboxylic acid having from 1 to 5 carbon atoms in such an amount as to impart a pH-value in the range 3–7 to said aqueous solution.

3. The composition of claim 2, said lower aliphatic carboxylic acid being a lower aliphatic hydroxy carboxylic acid.

4. The composition of claim 2, said lower aliphatic carboxylic acid being lactic acid.

5. A composition for cleansing live human hair, which is a homogeneous aqueous solution having a pH-value of the range 3–7, of a mixture of diamines of the general formula

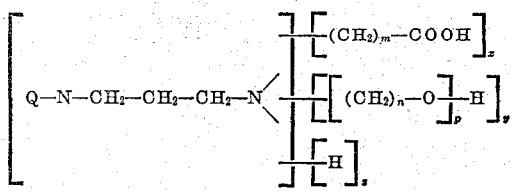

where, as an average for said mixture, $x$ and $y$ each represent a number from 1 to 2, the sum $x+y$ being at most equal to 3, and $z$ represents $3-(x+y)$, while Q represents a hydrophobic radical selected from the class consisting of straight aliphatic residues of fatty acids containing 12 to 22 carbon atoms and the dehydroabietyl radical, $m$ represents an integer from 1 to 3, $n$ represents an integer from 2 to 3, and $p$ represents a number from 1 to 8.

6. A composition for cleansing live human hair, which is a homogeneous aqueous solution of a mixture of diamines of the general formula

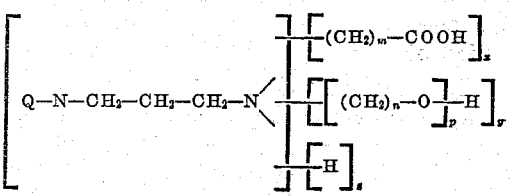

where, as an average for said mixture, $x$ and $y$ each represent a number from 1 to 2, the sum $x+y$ being at most equal to 3, and $z$ represents $3-(x+y)$, while Q represents a hydrophobic radical selected from the class consisting of straight aliphatic residues of fatty acids containing 12 to 22 carbon atoms and the dehydroabietyl radical, $m$ represents an integer from 1 to 3, $n$ represents an integer from 2 to 3, and $p$ represents a number from 1 to 8; and a lower aliphatic carboxylic acid having from 1 to 5 carbon atoms in such an amount as to impart a pH-value in the range 3–7 to said aqueous solution.

7. The composition of claim 6, said lower aliphatic carboxylic acid being a lower aliphatic hydroxy carboxylic acid.

8. The composition of claim 6, said lower aliphatic carboxylic acid being lactic acid.

References Cited in the file of this patent

UNITED STATES PATENTS

| 2,277,016 | Quest | Mar. 17, 1942 |
| 2,801,969 | Morway et al. | Aug. 6, 1957 |

FOREIGN PATENTS

| 787,819 | France | July 16, 1935 |